(12) United States Patent
Soga

(10) Patent No.: US 8,405,933 B2
(45) Date of Patent: Mar. 26, 2013

(54) DISK DRIVE SUSPENSION HAVING A LOAD BEAM AND FLEXURE, A PROJECTION HEIGHT OF A DIMPLE FORMED ON THE FLEXURE BEING LESS THAN A PROJECTING HEIGHT OF A PROTRUSION FORMED ON A SURFACE OF THE LOAD BEAM WHICH FACES THE DIMPLE

(75) Inventor: Jun Soga, Aiko-gun (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 252 days.

(21) Appl. No.: 12/879,076

(22) Filed: Sep. 10, 2010

(65) Prior Publication Data

US 2011/0096439 A1 Apr. 28, 2011

(30) Foreign Application Priority Data

Oct. 27, 2009 (JP) ................................. 2009-246828

(51) Int. Cl.
*G11B 5/55* (2006.01)
(52) U.S. Cl. .................................... 360/245.1
(58) Field of Classification Search ................ 360/245.1
See application file for complete search history.

(56) References Cited

U.S. PATENT DOCUMENTS 5,666,241 A * 9/1997 Summers .................... 360/245.1
6,115,221 A * 9/2000 Utsunomiya .............. 360/245.1

FOREIGN PATENT DOCUMENTS

| JP | 2005-135467 A | 5/2005 |
|---|---|---|
| JP | 2009-123282 A | 6/2009 |

\* cited by examiner

*Primary Examiner* — Allen Heinz
(74) *Attorney, Agent, or Firm* — Holtz, Holtz, Goodman & Chick, P.C.

(57) ABSTRACT

A disk drive suspension is provided with a load beam and a flexure. A tongue portion is formed on the flexure. The tongue portion comprises a slider mounting surface and a flat portion. A slider is mounted on the slider mounting surface. A dimple is formed on the flat portion. A tip of the dimple projects thicknesswise relative to the tongue portion toward the load beam. A protrusion is formed on a facing surface of the load beam. An end face of the protrusion projects thicknesswise relative to the load beam toward the dimple. As the tip of the dimple contacts the end face of the protrusion, the tongue portion is swingably supported on the protrusion.

5 Claims, 7 Drawing Sheets

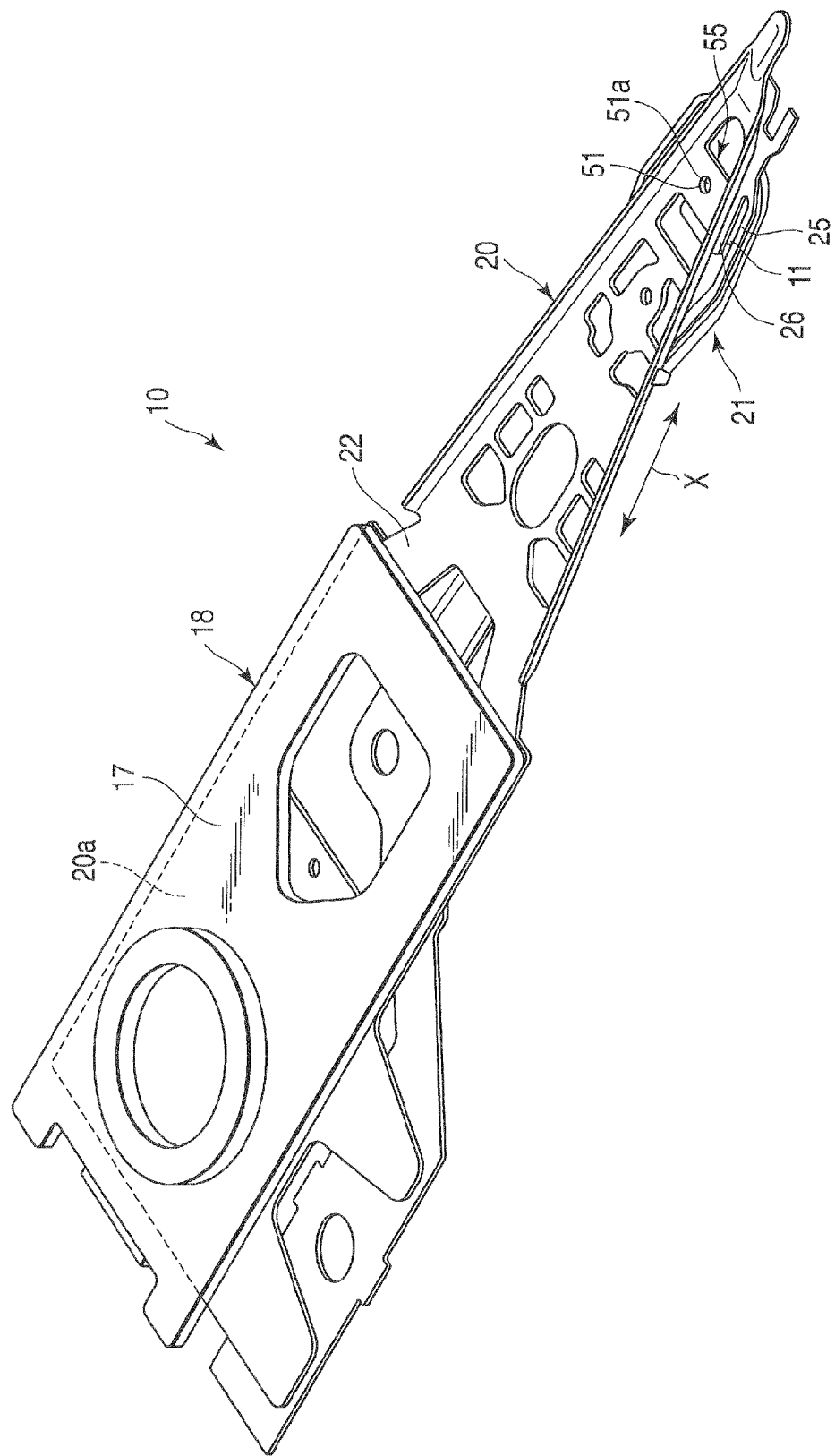
F I G. 3

DISK DRIVE SUSPENSION HAVING A LOAD BEAM AND FLEXURE, A PROJECTION HEIGHT OF A DIMPLE FORMED ON THE FLEXURE BEING LESS THAN A PROJECTING HEIGHT OF A PROTRUSION FORMED ON A SURFACE OF THE LOAD BEAM WHICH FACES THE DIMPLE

CROSS-REFERENCE TO RELATED APPLICATIONS

This application is based upon and claims the benefit of priority from prior Japanese Patent Application No. 2009-246828, filed Oct. 27, 2009, the entire contents of which are incorporated herein by reference.

BACKGROUND OF THE INVENTION

1. Field of the Invention

This invention relates to a disk drive suspension used in a disk drive for an information processing apparatus, such as a personal computer.

2. Description of the Related Art

A hard disk drive (HDD) is used in an information processing apparatus, such as a personal computer. The HDD comprises a magnetic disk rotatable about a spindle, a carriage turnable about a pivot, etc. The carriage, which comprises an actuator arm, is turned transversely relative to tracks about the pivot by a positioning motor, such as a voice coil motor.

A suspension is mounted on the actuator arm. The suspension comprises a load beam and flexure superposed thereon. A slider, which constitutes a magnetic head, is mounted on a gimbal portion formed near the distal end of the flexure. The slider is provided with elements (transducers) for accessing data, that is, for reading and writing. If the disk rotates, the slider slightly flies above its surface, and an air bearing is formed between the disk and slider.

The gimbal portion comprises a tongue portion on a part of the flexure. The slider is mounted on one surface of the tongue portion. A protuberance called a "dimple" is formed at the distal end portion of the load beam. The dimple protrudes from one surface of the load beam toward the tongue portion. The reverse side of the dimple is depressed in the other surface of the load beam.

As the tip of the dimple contacts the tongue portion, the tongue portion is supported so as to be swingable around the dimple tip. The slider, along with the tongue portion, makes a swinging motion (gimbal motion) around the dimple. In order to enable the slider to swing horizontally equally, the dimple needs to be formed on the transverse center of the slider.

The disk drive is expected to have a higher recording density and be small. Therefore, the slider should be positioned more accurately than previously. Means for accurately positioning a slider is proposed in Jpn. Pat. Appln. KOKAI Publication No. 2005-135467 (Patent Document 1).

On the other hand, sliders with various functions have also been proposed. For example, a slider is provided with circuit components for heat control and the like. One such slider is described in Jpn. Pat. Appln. KOKAI Publication No. 2009-123282 (Patent Document 2). Built-in functional components of the slider tend to be diversified. Thus, the number of terminals on the slider is apt to increase, and the pitch between the terminals is liable to be reduced. If the positional accuracy of the slider is poor, in this case, electrical connection between the slider terminals and terminals at the tongue portion may fail. Therefore, the positional accuracy of the slider needs to be increased. Further, the positional relationship between the slider and dimple should be regulated more accurately.

The flexure is secured to the load beam by laser welding or the like. Therefore, the mounting position of the flexure on the load beam can be regulated only with limited accuracy. In Patent Document 1 mentioned above, a dimple is disposed on a load beam. Despite maximally accurate regulation of the dimple position on the load beam, in this case, the positional accuracy between the dimple and slider inevitably worsens if the accuracy of the mounting position of the flexure on the load beam is poor.

Thereupon, a proposal has been made to increase the positional accuracy between a slider and dimple by forming the dimple on a tongue portion. In this case, the slider is secured to one surface (slider mounting surface) of the tongue portion by adhesive, and the dimple to the other surface.

The dimple requires some height to secure an allowed range of gimbal motion of the tongue portion. If the dimple is low-profiled, a part of the tongue portion interferes with the load beam when the swing angle of the tongue portion increases, so that the allowed range of gimbal motion is inevitably reduced. Thus, the dimple size cannot be reduced unlimitedly.

If the dimple is formed on the tongue portion, its reverse side defines a recess in the slider mounting surface of the tongue portion. If a small slider is mounted on the slider mounting surface of the tongue portion with a dimple of the conventional size, the ratio in size of the recess on the reverse side of the dimple to the slider increases. In the case of a miniature slider, in particular, the recess may cause the slider to tilt or reduce the bond strength of the slider on the tongue portion.

BRIEF SUMMARY OF THE INVENTION

This invention provides a disk drive suspension configured so that the relative positions of a slider and dimple can be accurately regulated and the allowed range of gimbal motion of a tongue portion can be prevented from being reduced despite the smallness of the dimple.

A disk drive suspension according to an aspect of the invention comprises a base section secured to an actuator arm of a click drive, a load beam supported on the actuator arm by the base section, a flexure superposed on the load beam, and a tongue portion formed on the flexure. The tongue portion includes a slider mounting surface on which a slider is mounted and a flat portion opposite from the slider mounting surface. A dimple is formed on the flat portion. The dimple includes a tip projecting thicknesswise relative to the tongue portion toward the load beam. A protrusion is formed on a facing surface of the load beam which faces the tongue portion. The protrusion includes an end face projecting thicknesswise relative to the load beam toward the dimple. The tongue portion is swingably supported on the protrusion with the end face in contact with the tip of the dimple.

In a preferred aspect of the invention, the height of projection of the dimple is less than that of the protrusion. Further, the area of the dimple as viewed from the tip side is less than that of the end face of the protrusion. An example of the dimple arcuately protrudes from the flat portion as viewed laterally relative to the tongue portion. An example of the protrusion is tapered like a frustum of a cone or pyramid so that its cross-sectional area along the facing surface, as viewed laterally relative to the load beam, is reduced toward the end face.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OR THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a perspective view of a disk drive suspension according to one embodiment of the invention;

DETAILED DESCRIPTION OF THE INVENTION

A disk drive suspension according to one embodiment of the present invention will now be described with reference to FIGS. 1 to 9.

Figure 1:
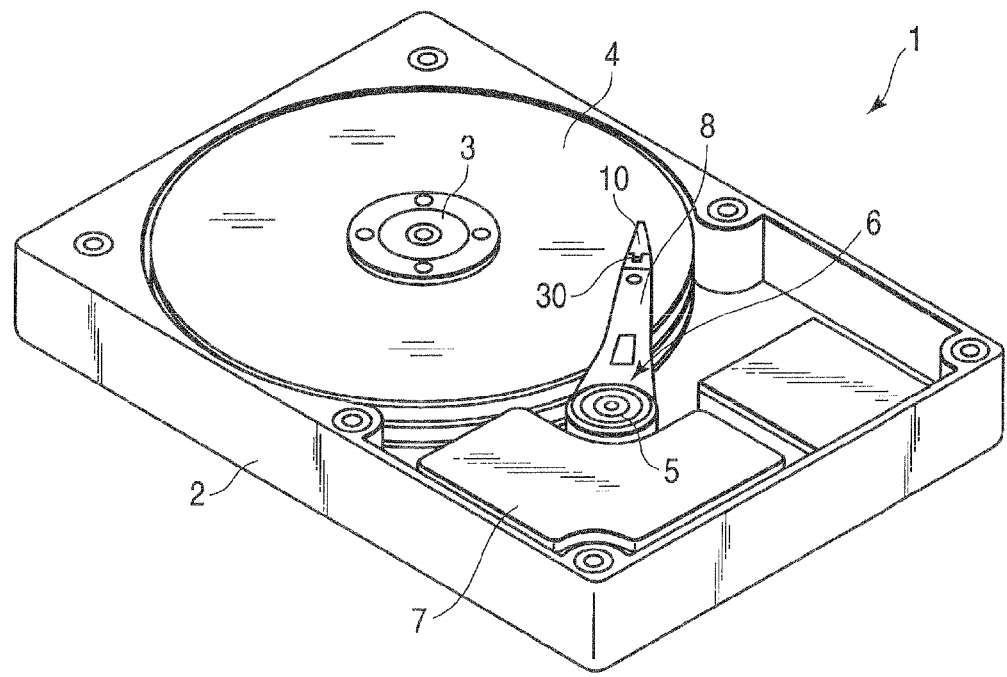
FIG. 1 is a perspective view showing an example of a disk drive.

A disk drive (HDD) 1 shown in FIG. 1 comprises a case 2, spindle 3, disks 4, pivot 5, carriage 6, positioning motor (voice coil motor) 7, etc. The disks 4 are rotatable about the spindle 3. The carriage 6 is turnable about the pivot 5. The positioning motor 7 can turn the carriage 6. The case 2 is sealed by a lid (not shown).

Figure 2:
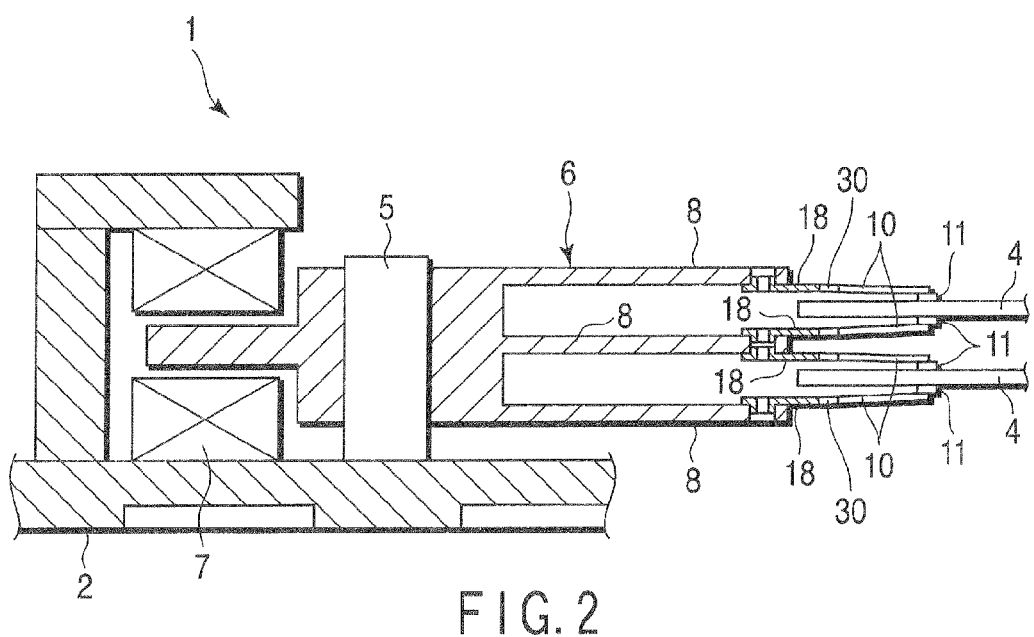
FIG. 2 is a sectional view of a part of the disk drive shown in FIG. 1.

FIG. 2 is a sectional view typically showing a part of the disk drive 1. As shown in FIG. 2, the carriage 6 comprises arms (actuator arms) 8. A suspension 10 is mounted on the distal end portion of each arm 8. A slider 11, which constitutes a magnetic head, is disposed on the distal end portion of the suspension 10. If each disk 4 is rotated at high speed, an air bearing is formed between the disk 4 and slider 11.

If the carriage 6 is turned by the positioning motor 7, the suspension 10 moves radially relative to the disk 4. Thereupon, the slider 11 moves to a desired track of the disk 4. Elements 12 (FIG. 6), such as magnetoresistive elements (MR elements) capable of conversion between electrical and magnetic signals, are disposed on an end portion of the slider 11. These elements 12 serve to access the disk 4, that is, to write or read data to or from the disk.

FIG. 3 shows the suspension 10 according to the one embodiment of the invention. The suspension 10 comprises a base section 18 including a baseplate 17, load beam 20, flexure 21 with conductors, etc. A proximal portion 20a of the load beam 20 overlaps the baseplate 17. The thickness of the load beam 20 ranges, for example, from about 30 to 100 μm.

The load beam 20 is secured to its corresponding arm 8 (FIGS. 1 and 2) by the base section 18. Springy hinge portions 22 are formed on the load beam 20. The hinge portions 22 can be elastically deformed thicknesswise. In FIG. 3, arrow X indicates the longitudinal direction (front-rear direction) of the suspension 10 or that of the load beam 20.

Figure 4:
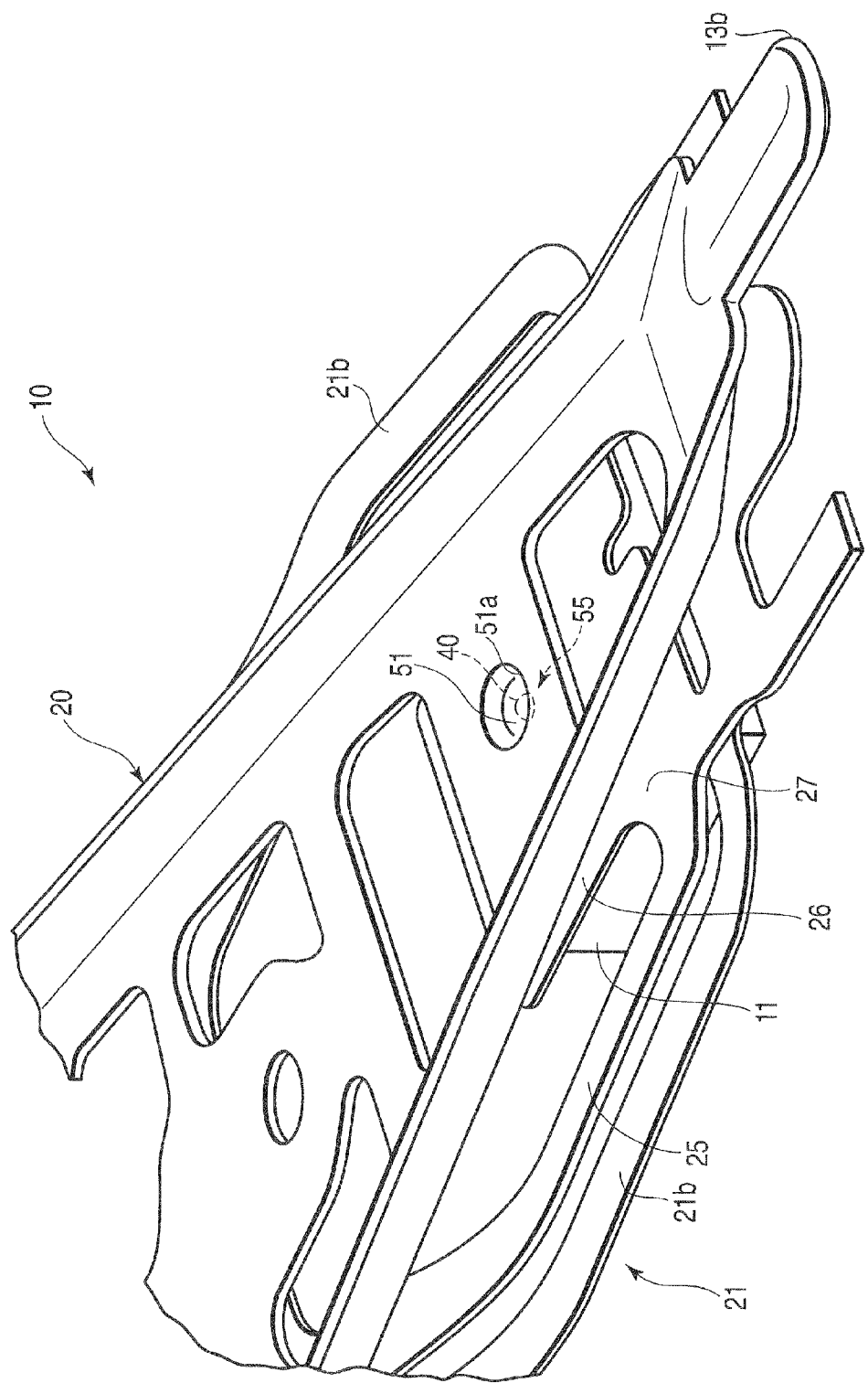
FIG. 4 is an enlarged perspective view showing the distal end portion of the suspension shown in FIG. 3.
Figure 5:
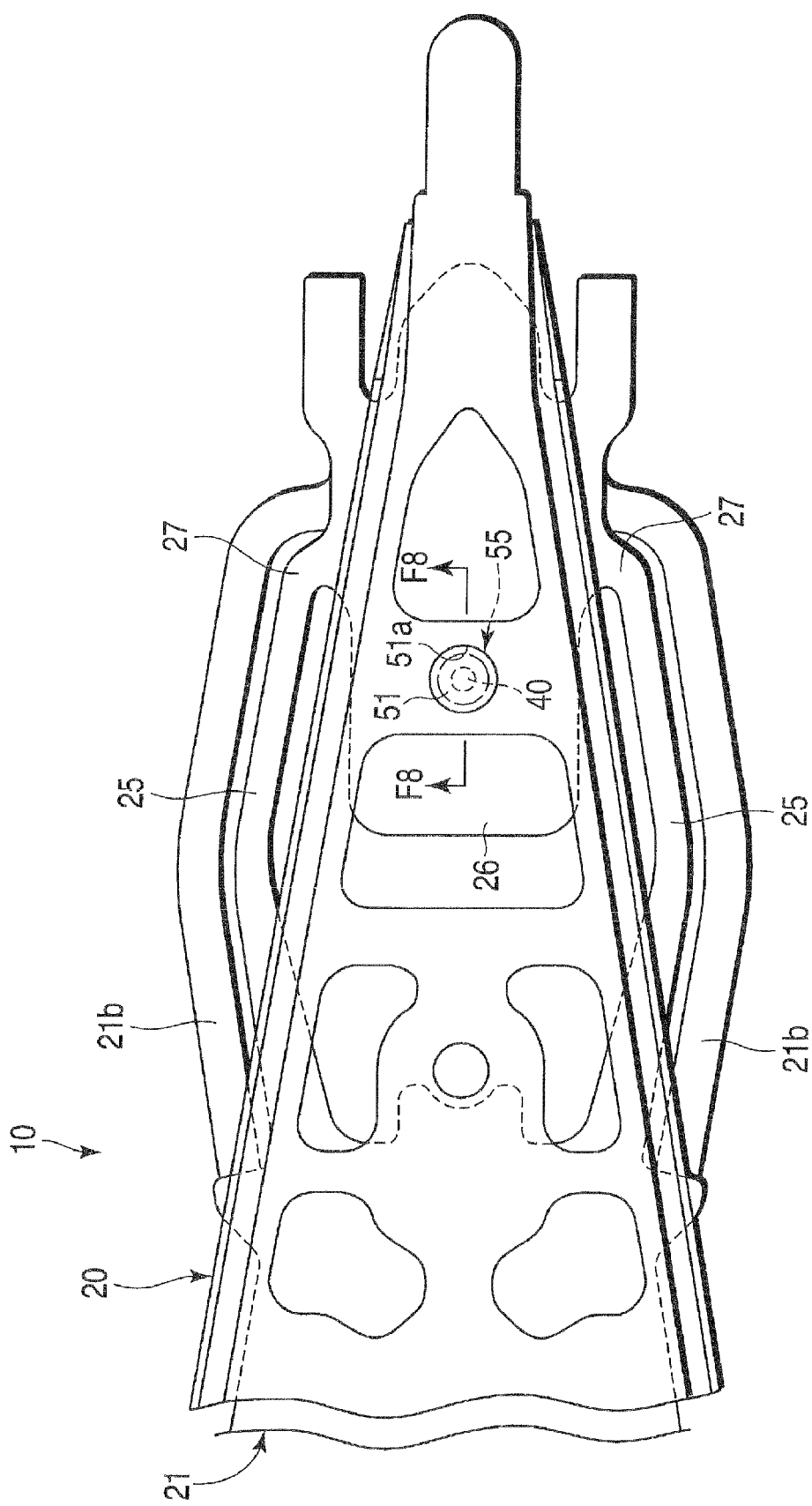
FIG. 5 is a plan view of the distal end portion of the suspension shown in FIG. 3.
Figure 6:
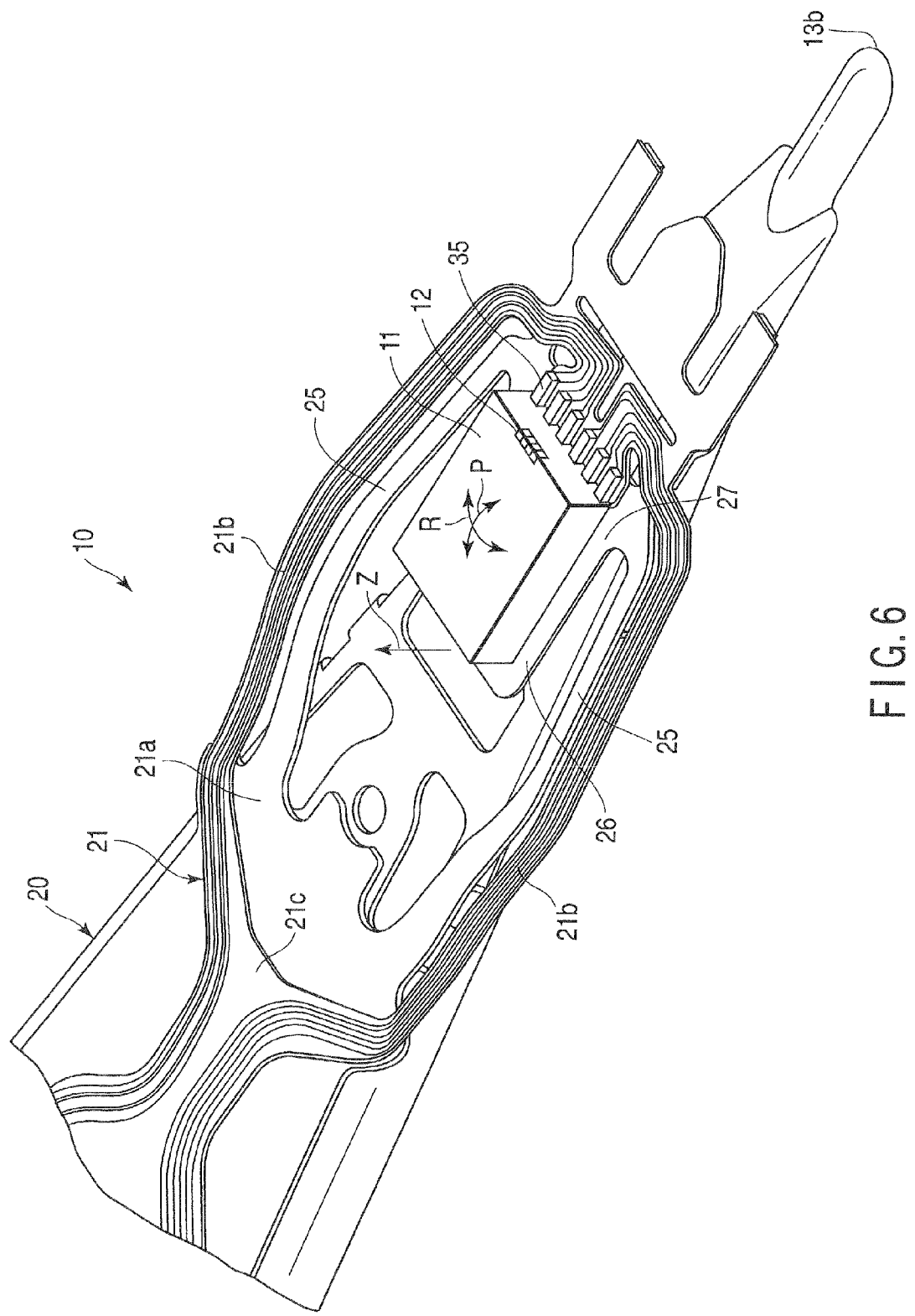
FIG. 6 is a perspective view of the distal end portion of the suspension of FIG. 3 taken from the side of a flexure.
Figure 7:
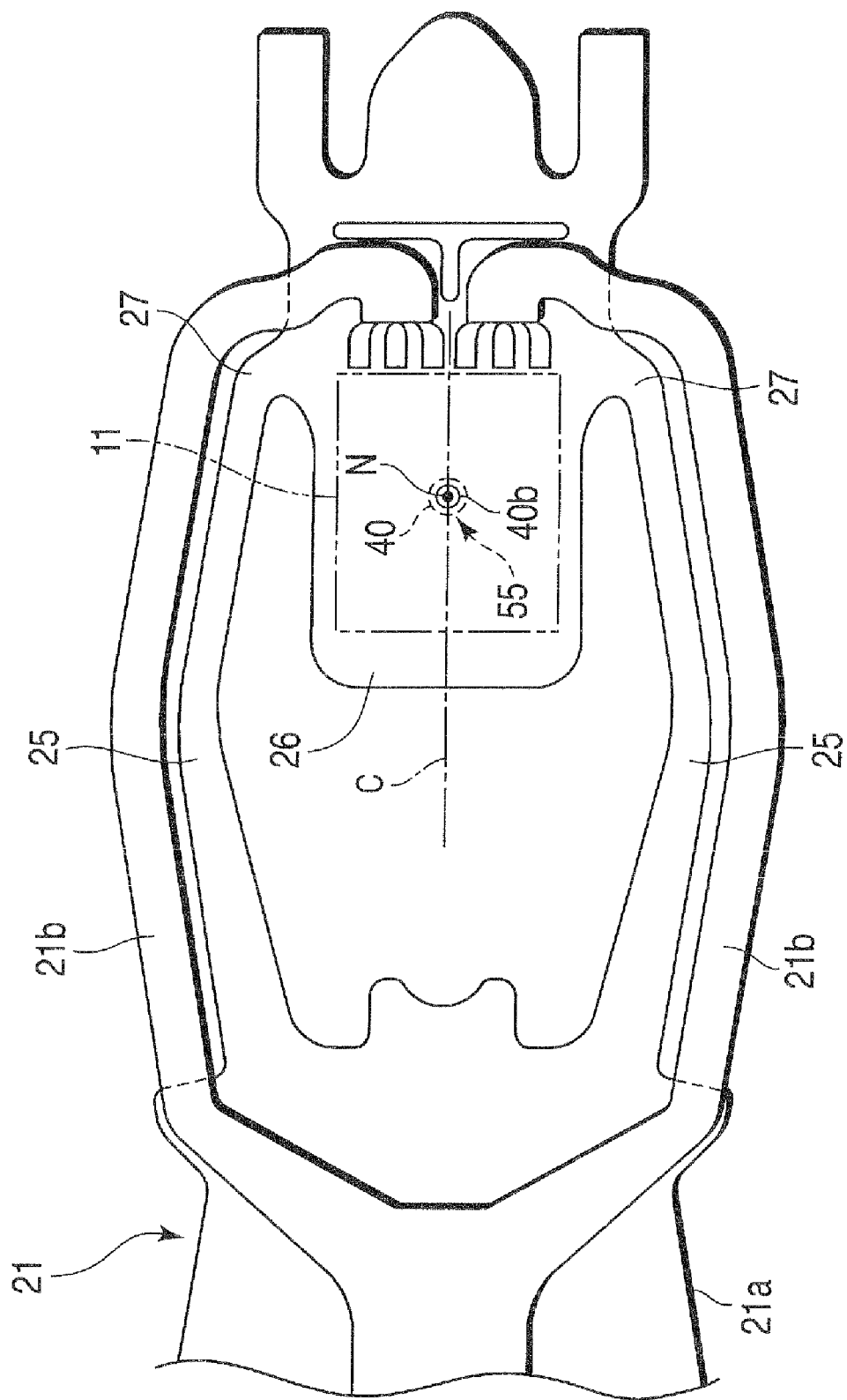
FIG. 7 is a plan view of the distal end portion of the suspension of FIG. 3 taken from the flexure side.

FIGS. 4 and 5 individually show the distal end portion of the suspension 10. FIGS. 6 and 7 are perspective and plan views, respectively, of the distal end portion of the suspension 10 taken from the opposite side from FIG. 4. As seen from FIGS. 4 to 7, the flexure 21 with conductors (hereinafter simply referred to as the flexure) is disposed along the load beam 20.

The flexure 21 comprises a metal base 21a and circuit member 21b of a predetermined pattern formed along the metal base 21a. The metal base 21a is formed of a metal plate thinner than the load beam 20. The circuit member 21b is formed above the metal base 21a with an electrically insulating layer 21c (FIG. 6) between them. The metal base 21a of the flexure 21 is formed of a rolled stainless-steel sheet about 10 to 25 μm thick, for example. The metal base 21a is secured to a predetermined portion of the load beam 20 by laser welding or the like.

The flexure 21 comprises a pair of outrigger portions 25, left and right, and tongue portion 26 as a movable portion. The tongue portion 26 connects with the outrigger portions 25 by means of a junction 27 formed near the distal end of the load beam 20. The tongue portion 26 is a springy part of the metal base 21a. Thus, the tongue portion 26 can be elastically deformed thicknesswise relative to the flexure 21.

Figure 8:
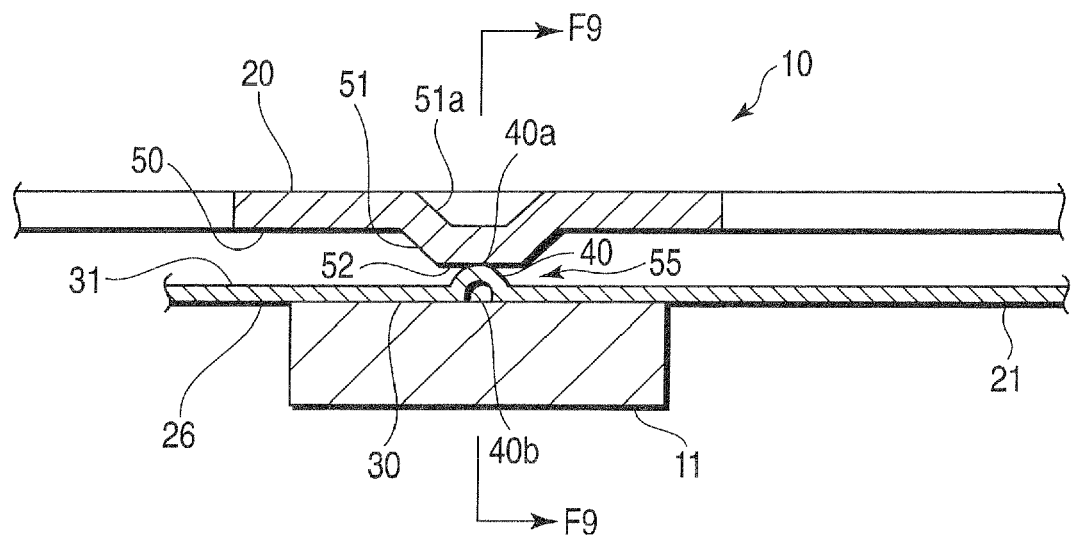
FIG. 8 is a partial sectional view of the suspension taken along line F8-F8 of FIG. 5.
Figure 9:
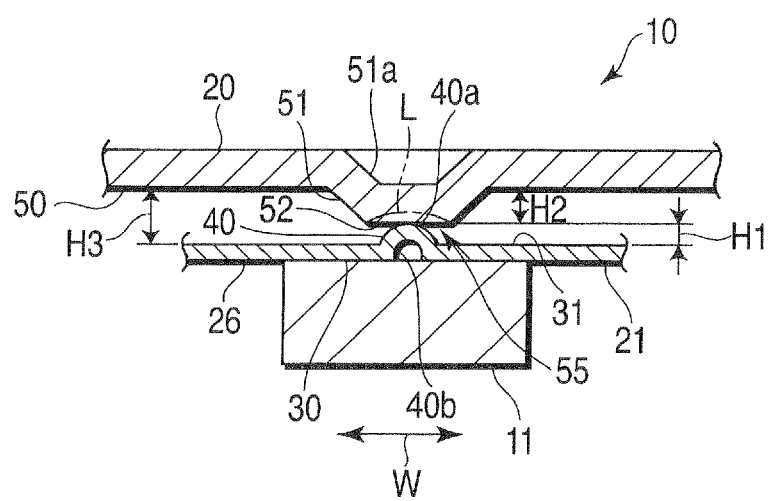
FIG. 9 is a partial sectional view of the suspension taken along fine F9-F9 of FIG. 8.

As shown in FIGS. 8 and 9, the tongue portion 26 comprises a slider mounting surface 30 and flat portion (first flat portion) 31. The flat portion 31 is located on the opposite side from the slider mounting surface 30. The slider 11 is mounted on the slider mounting surface 30. The elements 12 (FIG. 6) that function as magnetoelectric devices or transducers are provided on the front end portion of the slider 11. A terminal area 35 (FIG. 6) of the slider 11 is electrically connected to the circuit member 21b of the flexure 21. The slider 11 and suspension 10 constitute a head gimbal assembly.

A dimple 40 is formed on the tongue portion 26. The dimple 40 projects thicknesswise relative to the tongue portion 26 from the flat portion 31 of the tongue portion 26 toward the load beam 20. An example of the dimple 40 arcuately protrudes from the flat portion 31 as viewed laterally relative to the tongue portion 26. A tip 40a of the dimple 40 projects toward the load beam 20. As shown in FIG. 7, the dimple 40 is located near the center of gravity G of the slider 11 on its center line C.

The dimple 40 is formed by, for example, press-forming. Thus, a recess 40b is formed in the slider mounting surface 30 of the tongue portion 26, corresponding in position to the reverse side of the dimple 40. The dimple 40 may be formed by some means other than press-forming. For example, a dimple may be formed by etching its surrounding area. The height of projection H1 (FIG. 9) of the dimple 40 above the flat portion 31 is, for example, about 10 μm. The projection height H1 of the dimple 40 is sufficiently less than that (e.g., 50 μm) of a conventional dimple.

The slider 11 is secured to the slider mounting portion 30 by fixing means such as adhesive. The dimple 40 is formed on the transverse center (in the direction indicated by arrow W in FIG. 9) of the slider 11. In other words, the slider 11 is positioned on and secured to the slider mounting surface 30 so that its transverse, center is aligned with the tip 40a of the dimple 40.

The load beam 20 comprises a facing surface (second flat portion) 50 that faces the tongue portion 26. A protrusion 51 is disposed on that part of the facing surface 50 which corresponds to the dimple 40. The protrusion 51 is formed by press-forming. A depression 51a behind the protrusion 51 is formed in that surface of the load beam 20 opposite from the facing surface 50. However, the protrusion 51 may be formed by some means other than press-forming. For example, a protrusion may be formed by etching its surrounding area. Alternatively, a component for a protrusion may be attached to the load beam 20. The tongue portion 26, dimple 40, and protrusion 51 constitute a gimbal portion 55.

The protrusion 51 comprises an end face 52. The end face 52 projects thicknesswise relative to the load beam 20 toward the dimple 40. Although the protrusion 51 is illustrated as a frustum of a cone, for example, it may alternatively be a frustum of a pyramid or the like. In short, the protrusion 51 is trapezoidal or tapered so that its cross-sectional area along the facing surface 50 is reduced toward the end face 52 as viewed from the side of the load beam 20. Thus, the protrusion 51 can be easily formed by press-forming. In addition, the diameter of the end face 52 of the protrusion 51 can be made larger than that of the basal part of the protrusion 51. When the tongue portion 26 makes a gimbal motion around the dimple 40, therefore, it becomes reluctant to contact the protrusion 51, so that the allowed range of gimbal motion can be extended.

The height of projection H2 (FIG. 9) of the protrusion 51 from the facing surface 50 is, for example, about 40 μm. Height H2 of the protrusion 51 is more than height H1 of the dimple 40. Height H1 of the dimple 40 should preferably be less than about half height H2 of the protrusion 51. The area of the dimple 40 (as viewed from the side of the tip 40a) is less than that of the end face 52 of the protrusion 51. In short, the dimple 40 is a protuberance sufficiently smaller than the protrusion 51.

The tip 40a of the dimple 40 is in contact with the end face 52 of the protrusion 51. In other words, the tongue portion 26 is swingably supported by the protrusion 51 in a state where the tip 40a of the dimple 40 abuts the end face 52 of the protrusion 51. Thus, the tongue portion 26 can swing in rolling direction R (FIG. 6), pitching direction P, etc., around the tip 40a of the dimple 40.

According to the suspension 10 described above, the small dimple 40 that protrudes from the tongue portion 26 of the flexure 21 contacts the end face 52 of the protrusion 51 on the load beam 20. With the tip 40a of the dimple 40 supported by the end face 52 of the protrusion 51, the tongue portion 26 makes the gimbal motion around the dimple tip 40a at the gimbal portion 55.

Despite the small height of projection H1 (FIG. 9) of the dimple 40, therefore, a sufficient distance H3 can be secured between the flat portion 31 of the tongue portion 26 and the facing surface 50 of the load beam 20. Thus, although the dimple 40 is small, the tongue portion 26 can avoid interfering with the load beam 20 when it swings, and a normal allowed range can be secured for the gimbal motion.

Since the dimple 40 on the tongue portion 26 can be made small, moreover, the recess 40b behind it can be also made small. Even when the small slider 11 is mounted on the slider mounting surface 30, therefore, the slider 11 can be prevented from being tilted by the recess 40b and from being reduced in bond strength.

Since both the slider 11 and dimple 40 are arranged on the tongue portion 26, furthermore, the relative positions of the slider 11 and dimple 40 can be accurately regulated. Since the protrusion 51 on the load beam 20 needs only to be able to receive the tip 40a of the dimple 40, some poorness of the positional accuracy of the protrusion 51 cannot adversely affect the gimbal motion.

As indicated by two-dot chain line L in FIG. 9, the end face 52 of the protrusion 51 may be depressed in the center so that the tip 40a of the dimple 40 can contact the depressed end face 52. If this is done, the dimple tip 40a becomes less easily removable from the end face 52 of the protrusion 51.

According to the embodiment described above, the tongue portion swings (or makes the gimbal motion) around the tip 40a of the dimple 40 thereon with the dimple 40 in contact with the end face 52 of the protrusion. The flat portion 31 of the tongue portion 26 is kept at distance H3, which is equal to the sum of the respective heights of projection H1 and H2 of the dimple 40 and protrusion 51, from the facing surface 50 of the load beam. Although the dimple is small, therefore, a sufficient distance can be secured between the load beam and tongue portion, so that the allowed range of gimbal motion cannot be reduced. Since the slider and dimple are arranged on the tongue portion, moreover, their relative positions can be regulated more accurately.

It is to be understood, in carrying out the present invention, that the specific configurations, shapes, and layouts of the tongue portion, dimple, protrusion, etc., as well as the shapes of the load beam and flexure, may be variously modified without departing from the spirit or scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
   a base section secured to an actuator arm of a disk drive;
   a load beam supported on the actuator arm by the base section;
   a flexure superposed on the load beam;
   a tongue portion formed on the flexure and comprising a slider mounting surface on which a slider is mounted and a flat portion opposite from the slider mounting surface;
   a dimple formed on the flat portion of the tongue portion and comprising a tip projecting thicknesswise relative to the tongue portion toward the load beam; and
   a protrusion formed on a facing surface of the load beam which faces the tongue portion, comprising an end face projecting thicknesswise relative to the load beam toward the dimple, and swingably supporting the tongue portion with the end face in contact with the tip of the dimple;
   wherein a height of projection of the dimple is less than a height of projection of the protrusion, and an area of the dimple as viewed from the side of the tip is less than that of the end face of the protrusion.

2. A disk drive suspension according to claim 1, wherein the dimple arcuately protrudes from the flat portion as viewed laterally relative to the tongue portion.

3. A disk drive suspension according to claim 2, wherein the protrusion is tapered so that a cross-sectional area thereof along the facing surface, as viewed laterally relative to the load beam, is reduced toward the end face.

4. A disk drive suspension according to claim 1, wherein the end face of the protrusion comprises a flat portion which is in contact with the tip of the dimple.

5. A disk drive suspension according to claim 1, wherein the protrusion is tapered so that a cross-sectional area thereof along the facing surface, as viewed laterally relative to the load beam, is reduced toward the end face.

* * * * *